US011463675B2

(12) United States Patent
Himel et al.

(10) Patent No.: US 11,463,675 B2
(45) Date of Patent: *Oct. 4, 2022

(54) LIGHT-SOURCE CHARACTERIZER AND ASSOCIATED METHODS

(71) Applicant: Jenoptik Optical Systems LLC, Jupiter, FL (US)

(72) Inventors: Marc D. Himel, Winter Springs, FL (US); Gunnar H. Gunnarsson, Jupiter, FL (US); Andrea Koertvelyessy, Jena (DE); James J. Kumler, Jupiter, FL (US); Jan Werschnik, Jena (DE)

(73) Assignee: JENOPTIK OPTICAL SYSTEMS, LLC, Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,144

(22) Filed: Apr. 19, 2021

(65) Prior Publication Data
US 2021/0258559 A1    Aug. 19, 2021

Related U.S. Application Data

(63) Continuation of application No. 16/271,708, filed on Feb. 8, 2019, now Pat. No. 11,019,326.
(Continued)

(51) Int. Cl.
*H04N 13/254*    (2018.01)
*H04N 17/00*    (2006.01)
(Continued)

(52) U.S. Cl.
CPC .............. *H04N 13/254* (2018.05); *G01J 1/44* (2013.01); *G01S 7/497* (2013.01); *G01S 17/89* (2013.01);
(Continued)

(58) Field of Classification Search
CPC .... H04N 17/002; H04N 13/254; H04N 5/247; H04N 5/2353; H04N 13/246; G01J 1/44;
(Continued)

(56) References Cited

U.S. PATENT DOCUMENTS 7,321,423 B2    1/2008    Guttman
9,874,728 B1    1/2018    Zhong
(Continued)

FOREIGN PATENT DOCUMENTS

DE    102007057372    5/2009

OTHER PUBLICATIONS

Niclass et al., (2012) "Design and Characterization of a 256x64-pixel single-photon imager in CMOS for a MEMS-based laser scanning time-of-flight sensor," Optics Express, vol. 20, No. 11, 19 pp.

(Continued)

*Primary Examiner* — Boubacar Abdou Tchoussou
(74) *Attorney, Agent, or Firm* — Lathrop GPM LLP

(57) ABSTRACT

A method characterizes a scanning light source configured to emit illumination propagating in any one of a plurality of directions spanning an angular range. The method includes (i) detecting, with a camera, illumination propagating at each of the plurality of directions; (ii) storing image data corresponding to a response of the camera to the detected illumination. The method also includes (iii) processing the image data to characterize at least one of the angular range, pointing accuracy, pointing jitter, a divergence of the illumination, a uniformity of the illumination, and a fidelity of a scanning pattern, formed by the scanning light source, to a predetermined pattern.

18 Claims, 5 Drawing Sheets

Related U.S. Application Data

(60) Provisional application No. 62/735,761, filed on Sep. 24, 2018, provisional application No. 62/628,498, filed on Feb. 9, 2018.

(51) Int. Cl.
| | |
|---|---|
| *H04N 5/235* | (2006.01) |
| *H04N 5/247* | (2006.01) |
| *G06T 7/521* | (2017.01) |
| *G01S 17/89* | (2020.01) |
| *G01S 7/497* | (2006.01) |
| *G01J 1/44* | (2006.01) |
| *G01J 1/42* | (2006.01) |

(52) U.S. Cl.
CPC ............ *G06T 7/521* (2017.01); *H04N 5/2353* (2013.01); *H04N 5/247* (2013.01); *H04N 17/002* (2013.01); *G01J 2001/4247* (2013.01); *G06T 2207/10028* (2013.01); *G06T 2207/10048* (2013.01)

(58) Field of Classification Search
CPC .. G01J 2001/4247; G01S 7/497; G01S 17/89; G06T 7/521
See application file for complete search history.

(56) References Cited

U.S. PATENT DOCUMENTS

| | | | |
|---|---|---|---|
| 10,006,807 B2* | 6/2018 | Ehrmann | ............ G01M 11/0271 |
| 10,151,639 B2 | 12/2018 | Quere | |
| 10,209,202 B1 | 2/2019 | Sullivan | |
| 2005/0040314 A1* | 2/2005 | Kuo | ........................ G01J 1/42 |
| | | | 250/205 |
| 2005/0062964 A1 | 3/2005 | Guttman | |
| 2009/0185173 A1 | 7/2009 | Ashdown | |
| 2015/0373269 A1* | 12/2015 | Osborne | ............... G06T 1/0007 |
| | | | 348/38 |
| 2016/0042531 A1 | 2/2016 | Nolan | |
| 2016/0202118 A1* | 7/2016 | Ehrmann | .................. G01J 3/18 |
| | | | 250/252.1 |
| 2017/0082832 A1 | 3/2017 | Tang | |
| 2017/0205292 A1 | 7/2017 | Quere | |
| 2018/0263482 A1* | 9/2018 | Guan | ..................... F21V 14/04 |
| 2019/0098233 A1* | 3/2019 | Gassend | ............. H04N 5/2258 |

OTHER PUBLICATIONS

Chen et al., (2015) "Laser Scanner Jitter Characterization,"School of Electrical and Computer Engineering, Purdue University, May 2015, 5 pages.

* cited by examiner

LIGHT-SOURCE CHARACTERIZER AND ASSOCIATED METHODS

CROSS-REFERENCE TO RELATED APPLICATIONS

This application is a continuation application of U.S. patent application Ser. No. 16/271,708; filed Feb. 8, 2019 which claims priority to U.S. Provisional Application Nos. 62/628,498 and 62/735,761 filed on Feb. 9, 2018 and Sep. 24, 2018, respectively, the contents of which are incorporated by reference in its entirety.

BACKGROUND

Use of light detection and ranging (lidar) and three-dimensional (3D) mapping is expected to grow for decades. The move from single-point laser ranging to full 3D mapping has significantly expanded potential applications of lidar and 3D mapping. These applications include industrial inspection, 3D mapping for augmented reality, virtual reality, mixed reality, advanced driver-assistance systems, 3D mapping for drones and robots, and security.

Electro-optical devices are increasingly deployed that employ stereoscopic imaging, triangulation, structured light, and scanning and flash lidar (both time-of-flight methods). There is also growth in non-optical mapping technologies including 3D ultrasonics and classical radar.

SUMMARY

In a first aspect, a method for characterizing a scanning light source is disclosed. The scanning light source is configured to emit illumination propagating in any one of a plurality of directions spanning an angular range. The method includes (i) detecting, with a camera, illumination propagating at each of the plurality of directions and (ii) storing image data corresponding to a response of the camera to the detected illumination. The method also includes (iii) processing the image data to characterize at least one of the angular range, pointing accuracy, pointing jitter, a divergence of the illumination, a uniformity of the illumination, and a fidelity of a scanning pattern, formed by the scanning light source, to a predetermined pattern.

In a third aspect, a light-source tester for characterizing a scanning light source is disclosed. The scanning light source emits illumination propagating in any one of a plurality of directions spanning an angular range. The light-source tester includes a camera, a processor, and a memory. The camera has a system field of view equal to or exceeding the angular range. The processor is coupled to the camera. The memory stores machine-readable instructions that, when executed by the processor, control the processor to: (i) detect, with a camera, illumination propagating at each of the plurality of directions, (ii) store image data corresponding to a response of the camera to the illumination imaged thereon, and (iii) process the image data to characterize at least one of the angular range, an intensity of the illumination, a divergence of the illumination, and a uniformity of one or more of the illumination, pointing accuracy, and pointing jitter.

DETAILED DESCRIPTION OF THE EMBODIMENTS

Figure 1:
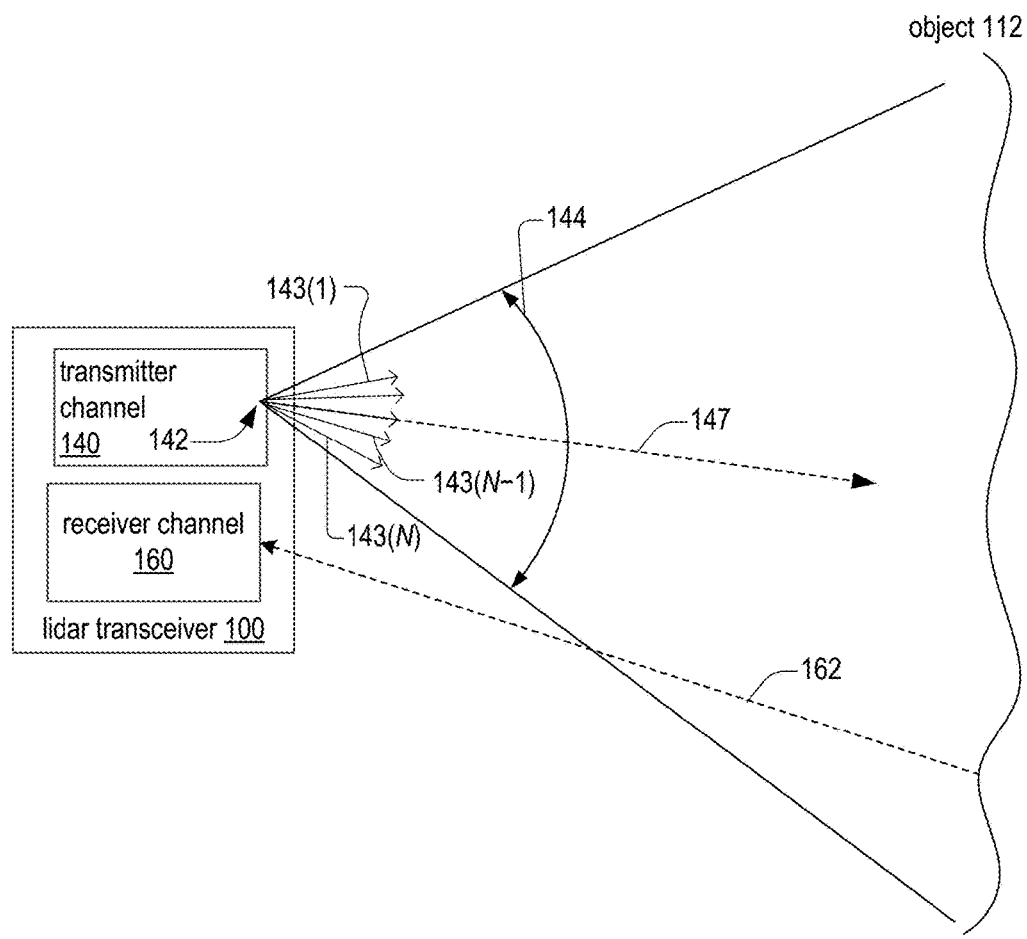
FIG. 1 is a schematic of a lidar transceiver deployed to render a 3D map of an object, in an embodiment.

FIG. 1 shows a lidar transceiver 100 deployed to render a 3D map of an object 112. Object 112 may be a building, terrain, or a human being. Transceiver 100 includes a transmitter channel 140 and a receiver channel 160. Transmitter channel 140 pulses and scans (in at at least one dimension) illumination 147 over object 112. Transmitter channel 140 and receiver channel 160 define a detection resolution and detection range of object 112. Illumination 147 may be generated by a laser, such as a pulsed laser, of transmitter channel 140. Transmitter channel 140 may include optics and a scanner, e.g., a micro-electro-mechanical system (MEMS) mirror, to pulse and scan illumination 147. Receiver channel 160 includes an optical detector that detects reflected illumination 162 returning to receiver channel 160. The optical detector may include a solid-state detector such as a photodiode array or photomultiplier. Data obtained from measurements by the optical detector of reflected illumination 162 is processed to render a 3D map of object 112 by determining the time-of-flight and distance traveled by illumination 147 and return reflected illumination 162. Lidar transceiver 100 may include a navigation unit to precisely locate lidar transceiver 100 even when it is in motion.

To operate effectively, lidar transceiver 100 must operate within certain performance specifications. For example, lidar transceiver 100 must scan illumination 147 over a defined field of view 144 in order to scan at least part of object 112 sufficient for an instant ranging application. Boresight accuracy must also be attained—so that the actual angular direction of illumination 147 is known relative to a point on object 112. A plurality of propagation directions 143(1-N) originating from a common vertex 142 spans field of view 144, where direction-count N is a positive integer. Field of view 144 may include at least one of a first angular range in a first plane, and a second angular range in a second plane perpendicular to the first plane. Herein, illumination 147(i) denotes illumination 147 propagating in direction 143(i), where i is a positive integer less than or equal to N.

Figure 2:
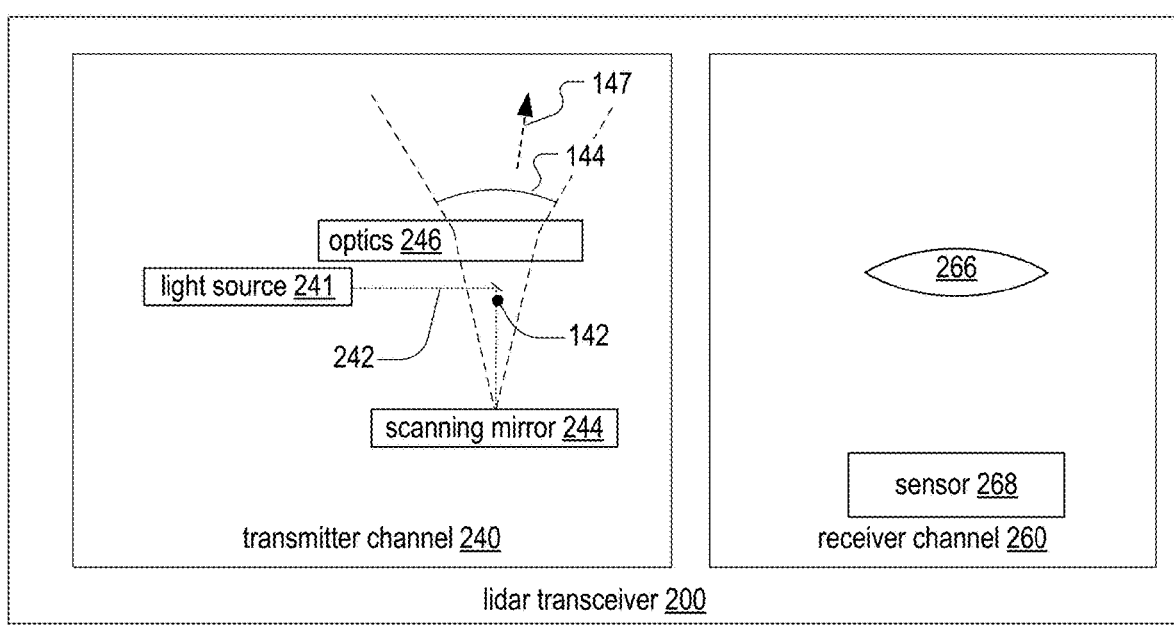
FIG. 2 is a schematic of a MEMS based lidar transceiver, illustrated as separate transmitter channel and receiver channel acting as the transmitter and receiver respectively, of FIG. 1.

FIG. 2 shows a MEMS-based lidar transceiver 200, which includes a transmitter channel 240 and receiver channel 260, which are examples of transmitter channel 140 and receiver channel 160, respectively, of FIG. 1. In transmitter channel 240, a light source 241 generates an illumination beam 242 that is scanned through field of view 144 by a scanning mirror 244 and transmitted through optics 246 toward object 112. In receiver channel 260, lens 266 and a sensor 268 collectively capture reflected illumination 162. Light source 241 may include one or more lasers, one or more light-emitting diodes (LEDs), any other light source, or a combination thereof. Light source 241 may emit temporally pulsed light, e.g., as generated by a pulsed laser. Sensor 268 may be an avalanche photodiode-array detector.

Lidar transceiver 200, FIG. 2, is an example of a scanning lidar geometry. In this configuration, light from one or more near-IR and/or short-wave infrared sources (such as light source 241) is collimated or focused onto a scanning mirror 244 to scan the light over field of view 144. Scanning mirror 244 may be a 1D or 2D MEMS scanning mirror.

At receiver channel 260, reflected illumination 162 is collected by an imaging lens 266. Receiver channel 260 may have a field of view that is greater than or equal to field of view 144 of transmitter channel 240. Reflected illumination 162 is detected by sensor 268. Lens 266 of receiver channel 260 images the entire field of view 144 into a line perpendicular to the scan direction. Each pulse of light source 241 effectively represents a circular sector of the scanned field of view 144 in the scan direction. Capture of multiple pulses enables the buildup of a 3D image of object 112.

Advantageously, by employing a 3D transceiver testing system described herein, performance specifications of lidar transceivers (or other 3D sensing sources such as structured-light sources) may be measured accurately, quickly, in an automated fashion, for example, in succession for large production volumes when many 3D transceivers need to be individually tested.

Light-Source Characterizer

Figure 3:
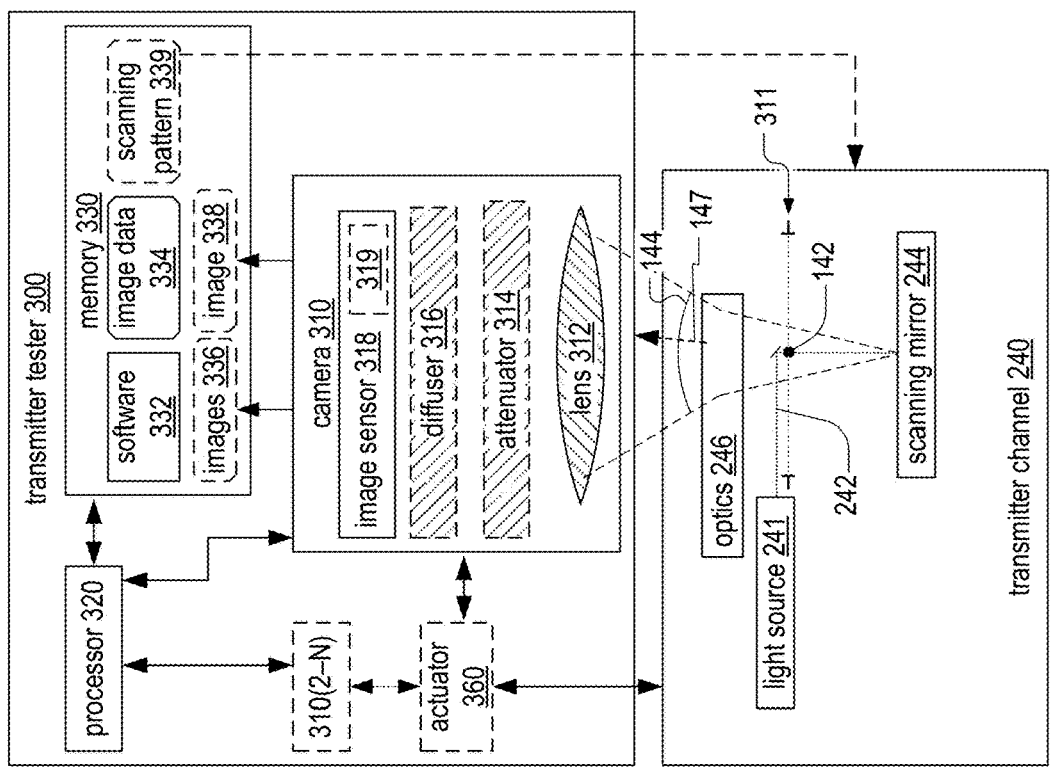
FIG. 3 is a schematic of a light-source characterizer, in an embodiment.

FIG. 3 is a schematic block diagram of a light-source characterizer 300 configured to characterize transmitter channel 240. Light-source characterizer 300 may include at least one camera 310, which includes a lens 312 and an image sensor 318. Camera 310 has an entrance pupil 311. Camera 310 may be positioned with respect to transmitter channel 240 such that vertex 142 is in a plane of entrance pupil 311.

Light-source characterizer 300 may be configured to test one or more of the following performance specifications of transmitter channel 240 and properties of illumination beam 242: (i) projected field of view (field of view 144), (ii) relative intensity/irradiance, power/energy at a single point (e.g., for a single light propagation angle) or over field of view 144, (iii) beam divergence, e.g., as indicated by a width of illumination beam 242 on image sensor 318, and (iv) transmitter stability, e.g., over operating temperature range). Examples of transmitter stability include jitter (stability of the specific placement of illumination beam 242 in the far field over time), intensity/irradiance variation at a specific field point over time, changes in global uniformity, changes in average and instantaneous power, changes in projected field of view 144, changes in beam placement, and changes in beam divergence.

Lens 312 may be a flat-field lens, an f sin θ lens, an fθ lens, or an f tan θ lens and may have a working distance between fifty and seventy millimeters. Lens 312 may have a maximum f-theta distortion not exceeding 0.1% at chief-ray angles less than a maximum scan angle. The maximum scan angle may equal one-half of field of view 144. In an embodiment, the maximum scan angle is between twenty-five and twenty-eight degrees.

Camera 310 may have a full field of view that exceeds field of view 144 of transmitter channel 240. The full field of view of camera 310 may be greater than or equal to thirty-three degrees. In an embodiment, the field of view is at least fifty degrees (±25°). The aforementioned maximum scan angle of lens 312 may be one-half the full field of view of camera 310.

Image sensor 318 may be a CMOS image sensor configured to detect at least one of visible and near-IR wavelengths. Image sensor 318 may include a pixel array 319, which, in an embodiment, includes at least twenty-five million pixels. In an embodiment, image sensor 318 is configured, via use of a spectral band-pass filter for example, to detect wavelengths between 1.0 µm and 2.0 µm. In an embodiment, image sensor 318 is configured, via use of a spectral band-pass filter for example, to detect wavelengths between 0.8 µm and 1.06 µm.

Light-source characterizer 300 may also include a diffuser 316, which may be between lens 312 and image sensor 318. Image sensor 318 may have a spectral response that is not optimized for the wavelength of illumination 147. For example, illumination 147 may have a center wavelength that is longer than the wavelength range corresponding to image sensor 318's peak spectral response. Diffuser 316 may convert illumination 147 to a wavelength closer to the peak spectral response of image sensor 318. For example, diffuser 316 may include one or more of a fluorescent material and a phosphorescent material. A distance between image sensor 318 may be minimized such that light reemitted from diffuser 316 that reaches image sensor 318 is minimally displaced from the optical path of illumination 147. Diffuser 316 may be on a cover glass of image sensor 318.

Light-source characterizer 300 may also include an attenuator 314 to prevent saturation of image sensor 318. Attenuator 314 may be a variable attenuator, and may include at least one of a neutral-density filter, a gradient neutral-density filter, and a polarizer. Attenuator 314 may be between lens 312 and image sensor 318, or in front of lens 312 such that lens 312 is between attenuator 314 and image sensor 318.

Light-source characterizer 300 may include additional cameras 310, denoted by 310(2-N), where N is the total number of cameras 310 included in light-source characterizer 300. Each camera 310 is characterized by at least one of (i) a respective one of a plurality of mutually coplanar optical axes intersecting vertex 142 and spanning an angular range greater than or equal to field of view 144 and (ii) a respective one of a plurality of entrance pupils 311, each of which may be positioned such that vertex 142 is in a respective plane of each entrance pupil 311.

Cameras 310(1-N) may have a composite full field of view that exceeds field of view 144 of transmitter channel 240. When light-source characterizer 300 includes one and only one camera 310, the camera 310 may have a full field of view that exceeds field of view 144 of transmitter channel 240. Light-source characterizer 300 may include an actuator 360 configured to translate and/or rotate one or both of camera 310 and transmitter channel 240 with respect to each other.

Light-source characterizer 300 may include a memory 330 and a processor 320 communicatively coupled to camera 310 and memory 330. When light-source characterizer 300 includes additional cameras 310(2-N), processor 320 may also be communicatively coupled to at least one of additional cameras 310(2-N). Memory 330 may store software 332 and at least one of image data 334, illumination images 336, illumination image 338, and a scanning pattern 339. Scanning pattern 339 may be an analytical or numerical expression (a look-up table, for example) of a scanning pattern executed by transmitter channel 240. Transmitter tester 300 may be communicatively coupled to transmitter channel 240 such that transmitter channel 240 receives scanning pattern 339 from transmitter tester 300 and scanning mirror 244 executes a scanning pattern according to scanning pattern 339.

Memory 330 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 330 may be integrated into processor 320.

Software 332 may include machine-readable instructions that, when executed by processor 320, control processor 320 to (i) detect, with camera 310, illumination 147 propagating at each of the plurality of directions 143 and (ii) store image data corresponding to a response of camera 310 to the illumination 147 imaged thereon.

Software 332 may include machine-readable instructions that, when executed by processor 320, control processor 320 to process image data to determine at least one property of illumination 147 selected from the group consisting of angular range, intensity, divergence, uniformity, pointing accuracy, and pointing jitter.

Figure 4:
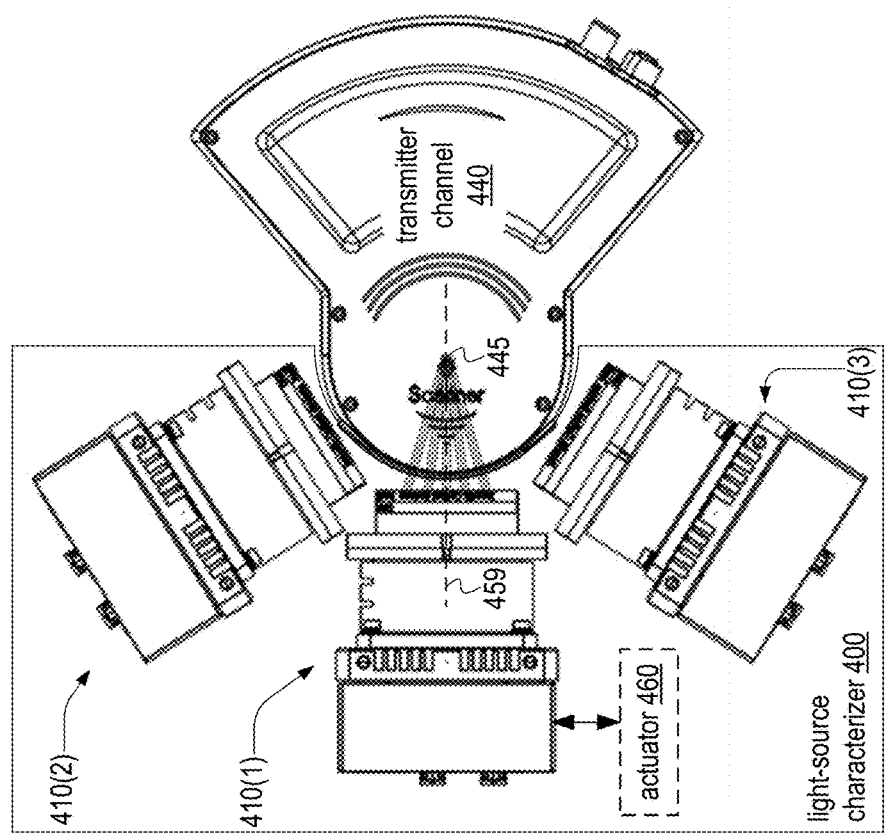
FIG. 4 is a schematic of three light-source characterizers of FIG. 3 configured to test a lidar transmitter channel, in an embodiment.

FIG. 4 is a schematic of a light-source characterizer 400 configured to test a transmitter channel 440. Light-source characterizer 400 and transmitter channel 440 are examples of light-source characterizer 300 and transmitter channel 240, respectively. Transmitter channel 440 has a vertex 445, which is an example of vertex 142. Light-source characterizer 400 may include three cameras 410(1), 410(2), and 410(3), which are examples of camera 310(1), 310(2), and 310(3), respectively.

In an embodiment, light-source characterizer 400 includes a camera 410(1) and an actuator 460, which are examples of camera 310 and actuator 360, respectively. Camera 410(1) has an optical axis 459 and may be oriented such that optical axis 459 intersects vertex 445. Actuator 460 may be configured to move at least one camera 410 along a circular arc around vertex 445 in a plane perpendicular to optical axis 459. Transmitter channel 440 may remain stationary during such translation. Alternatively, actuator 460 may be configured to rotate transmitter channel 440 about vertex 445 in a plane perpendicular to optical axis 459. Cameras 410 may remain stationary during such a rotation.

Receiver Characterizer

Figure 5:
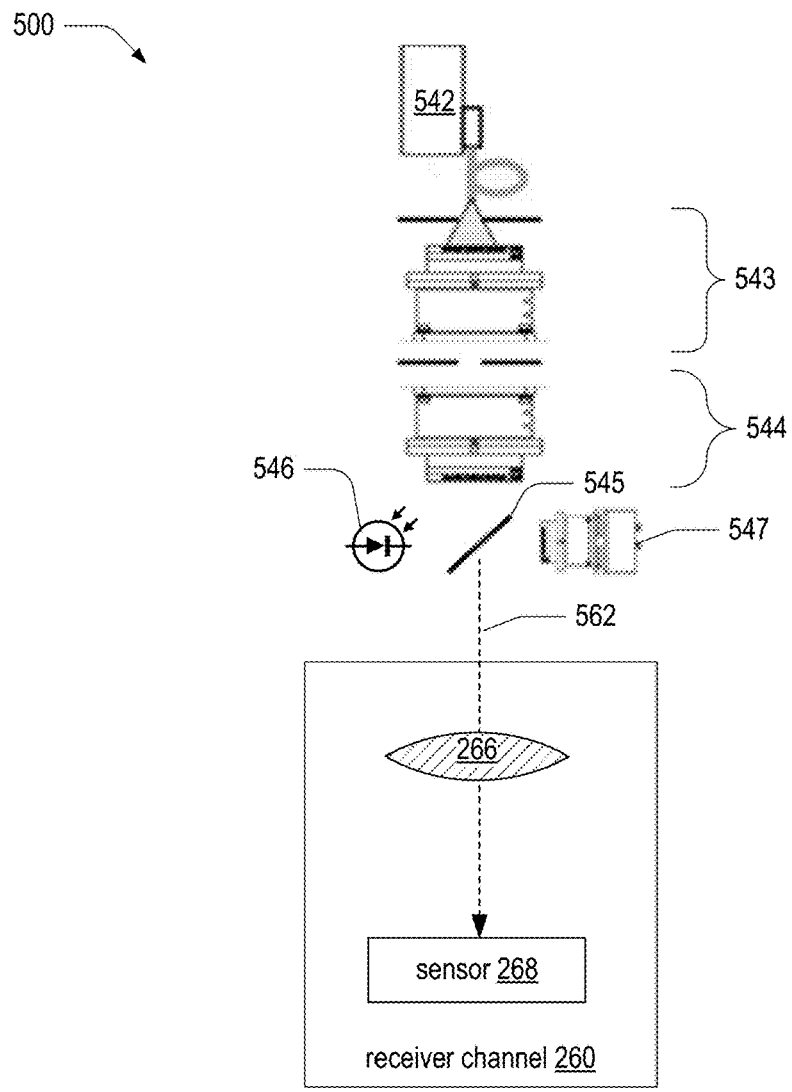
FIG. 5 is a schematic of a receiver characterizer, in an embodiment.

FIG. 5 is a schematic block diagram of a receiver characterizer 500 configured to characterize receiver channel 260. Receiver characterizer 500 is configured to test one or more of the following performance specifications of receiver channel 260: dark noise, minimum detectable signal, dynamic range, responsivity, gain versus bias voltage, linearity, stability, rise time, pixel to pixel cross talk for multi-element detectors, field of view, vignetting, and temperature and humidity dependence of any of the above.

Receiver characterizer 500 includes at least one light source 542, a first imaging system 543 to create an accessible pupil plane, and a second imaging system 544. Light source 542 generates illumination 562, which is directed by at least one of imaging systems 543 and 544 to sensor 268 of receiver channel 260. Receiver characterizer 500 may also include additional components, such as a beam splitter 545 to sample the light with a power meter 546. One or more filters and/or polarizers to control the spectrum and irradiance of light source 542 may be included. Receiver characterizer 500 may also be designed to reduce or eliminate ghost images from illuminating the sensor under test. Light source 542 may be one or more lasers, one or more LEDs, any other light source, or a combination thereof. The one or more LEDs may include at least one of an ultraviolet LED, a visible-light LED, and a near-IR LED. When light source 542 includes multiple light sources, receiver characterizer 500 may include one or more beam splitter cubes and/or dichroic mirrors to combine them.

Light source 542 may be continuous-wave or pulsed depending on the requirements that need to be tested. In an embodiment, light source 542 includes a pulsed laser in combination with a continuous-wave source that closely matches the solar spectrum. In this embodiment, receiver characterizer 500 may be used to test the performance of an avalanche photodiode of sensor 268, which should only detect the pulsed source while suppressing detection of the continuous-wave source.

In some cases, a NIST-traceable, or similarly traceable, power measurement is taken at an image plane of receiver characterizer 500 so that the absolute responsivity of sensor 268 can be measured. Receiver characterizer 500 may also include a camera 547 that images the detector under test to enable alignment and size verification of the illumination source (e.g., light source 542) onto sensor 268 under test. Receiver characterizer 500 may also include electronics to drive light sources 542, to connect receiver channel 260 and connect to a computer to collect, analyze, and interpret output from receiver channel 260. Receiver characterizer 500 may include automated motion stages to adjust focus, beam size, divergence, to align to receiver channel 260, and to scan receiver channel 260 to evaluate multiple pixels, etc.

Combined Transceiver Test

Light-source characterizer 300 and receiver characterizer 500 may be combined into one test apparatus. One such embodiment is transceiver tester 600, illustrated in FIG. 6 as being configured to test both transmitter channel 240 and receiver channel 260 of lidar transceiver 200. As a single instrument, transceiver tester 600 may include a housing 610 mechanically attached to at least one of light-source characterizer 300 and receiver characterizer 500. Light-source characterizer 300 and receiver characterizer 500 may be configured within housing 610 such that transceiver tester 600 has a small footprint. Housing 610 may also contain delay line 660. For example, light-source characterizer 300 and receiver characterizer 500 may be stacked, one on top of the other, such that the footprint of transceiver tester 600 equals the larger of the respective footprints of characterizers 300 and 500.

Time-of-Flight Testing for 3D Lidar Systems

In addition to testing the transmitter and receiver functions of a lidar transceiver 200 or a similar system, many parameters of the time-of-flight test may be measured. Time-of-flight is a method of measuring a distance d between a lidar transceiver and at target by measuring the time t it takes for light to travel to the target and back to the sensor of the transceiver. The distance, d, is equal to $c \cdot t/2$ where c is the speed of light.

Lidar systems need to operate over different distance ranges depending on specific application. Some applications such as aviation and military may be required to measure distance to many kilometers while automotive applications may need to measure within a 300-meter range. Current systems deployed for advanced driver-assistance systems require complex testing in 300-meter long tunnels to verify performance. While the large footprint of such tunnel-based testing may be tolerable when shipping small volumes, the cost may become prohibitive as production ramps to millions of units per year and a smaller test stand may be needed.

Figure 6:
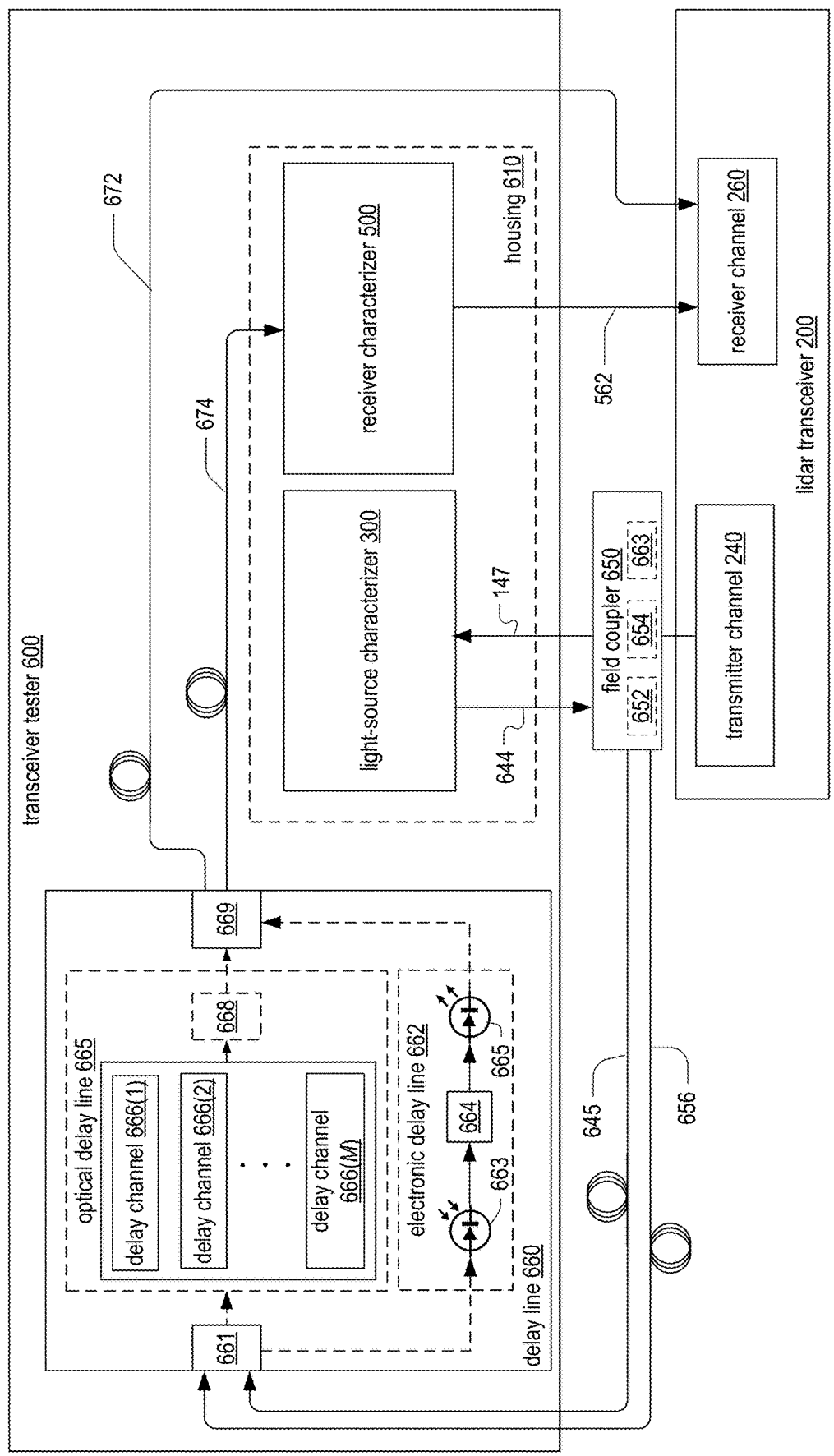
FIG. 6 is a schematic of a transceiver tester that includes the light-source characterizer of FIG. 3 and the receiver characterizer of FIG. 5, in an embodiment.

Incorporation of one or more delay lines into transceiver tester 600 enables testing of lidar transceiver 200 with a relatively compact device. FIG. 6 illustrates one such delay line 660. The delay can be achieved optically, e.g. with optical fiber, or electronically, e.g., by converting the optical signal to an electrical signal, delaying the electrical signal before converting the electrical signal back to an optical signal.

FIG. 6 illustrates delay line 660 coupled to transceiver tester 600. Delay line 660 includes at least one of an input port 661, an electronic delay line 662, an optical delay line 665, optical detector 667, an optical switch 668, and an output port 669. A first single optical fiber 656 may be inserted into the field of view of the transmitter channel 240 such that a small amount of light is transmitted through optical fiber 656 when the light from transmitter channel 240 is directed at optical fiber 656. Optical delay line 665 may include one of more delay channels 666(1, 2, . . . , M) into which light guided by optical fiber 656 may be coupled, where M is a positive integer that may be less than or equal to direction-count N. Each delay channel 666 may have a different optical path length to introduce different time delays before illumination 147 reaches receiver channel 260. The time delay may correspond to a light-propagation distance of up to three-hundred meters or up to several kilometers. The light output from optical delay line 665 may be directed into receiver channel 260, via an output port 669 to measure the time-of-flight, and hence verify time-of-flight measurements of lidar transceiver 200. Delay line 660 may include an optical switch 668 between delay channels 666 and output port 669. Optical switch 668 may be configured such that output port 669 receives light from one delay channel 666 at a time.

Output port 669 may include coupling hardware for connecting to at least one of optical fibers 672 and 674. Optical fiber 672 couples light output from delay line 660 to receiver channel 260. Optical fiber 674 couples light output from delay line 660 into receiver characterizer 500. Light source 542 may include light output from delay line 660.

Transceiver tester 600 may include a field coupler 650 configured to couple illumination 147 propagating at different directions 143. Field coupler 650 may be aligned with transmitter channel 240 and include a plurality of optical fibers each having an optical axis that is parallel to a respective direction 143 such that each optical fiber couples illumination 147(i) propagating at its respective direction 143(i). Optical fiber 656 may include a plurality of optical fibers, and may couple output of field coupler 650, e.g., output of each optical fiber of field coupler 650, to a respective delay channel 666. Transceiver tester 600 may include an actuator 652 configured to move field coupler 650 in and out of the path of illumination 147. Transceiver tester 600 may include a reflective optical element 654 for directing part or all of illumination 147 to field coupler 650. Reflective optical element 654 may be a beamsplitter or a mirror.

Light-source characterizer 300 may reflect illumination 147 incident thereon as reflected illumination 644. Field coupler 650 may receive reflected illumination 644 and couple it to an optical fiber 645, which is coupled into input port 661. Optical fiber 645 may be positioned so as not to impact the light collected by the image sensor 318 of light-source characterizer 300. Optical fiber 645 may include a plurality of optical fibers.

When delay line 660 includes electronic time delay line 662, illumination 147 or 644 may be directed to optical detector 663 such as a photodiode, avalanche photodiode, or single-photon avalanche diode, which converts the optical signal (illumination 147 and/or 664) into an electrical signal. This electrical signal is input into a programmable electronic time delay circuit 664 which is then used to drive a light source 665 (e.g. an LED or laser diode) to recreate the pulse that is now delayed in time. The output of light source 665 may be directed to receiver channel 260 via output port 669. The delay generator may be programmed to sequence through multiple time delays triggered by the pulses from the unit under test. Optical detector 663 may be part of field coupler 650.

Figure 7:
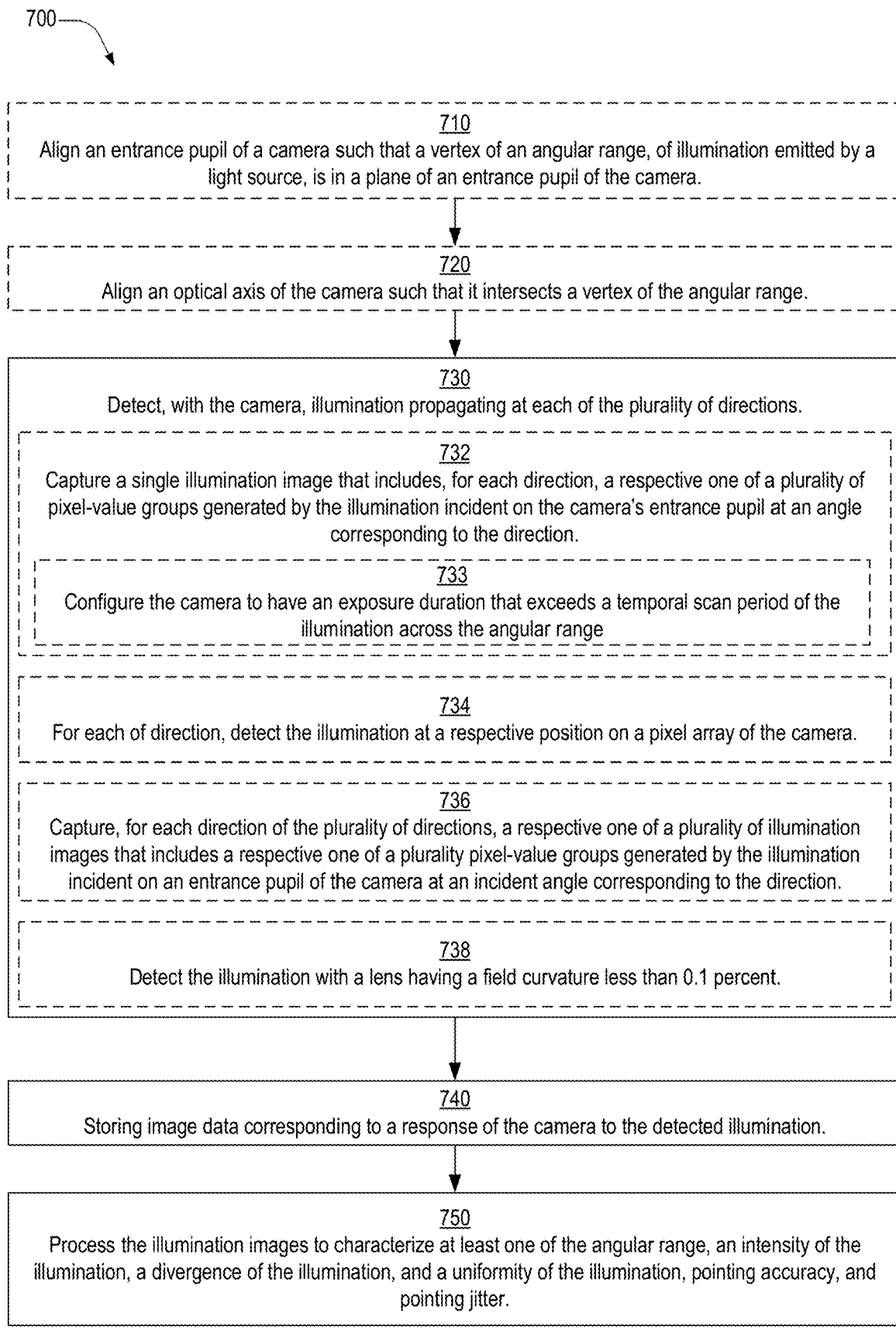
FIG. 7 is a flowchart illustrating a method for characterizing a scanning light source, in an embodiment.

FIG. 7 is a flowchart illustrating a method 700 for characterizing a scanning light source configured to emit illumination propagating in any one of a plurality of directions spanning an angular range. Examples of the scanning light source characterized by method 700 include transmitter channels 140 and 240. Illumination 147, directions 143, and field of view 144 are examples of the illumination, the plurality of directions, and the angular range, respectively, of method 700. Method 700 may be implemented within one or more aspects of light-source characterizer 300. In one example, method 700 is implemented by processor 320 executing computer-readable instructions of software 332. Method 700 includes at least one of steps 710, 720, 730, 740, and 750.

Step 710 includes aligning an entrance pupil of a camera such that a vertex of the angular range is in a plane of an entrance pupil of the camera. In an example of step 710, entrance pupil 311 of camera 310 is aligned with respect to transmitter channel 240 such that vertex 142 is in a plane of an entrance pupil 311.

Step 720 includes aligning an optical axis of the camera such that it intersects a vertex of the angular range. In an example of step 720, camera 310 is aligned to transmitter channel 240 such that the optical axis of lens 312 intersects vertex 142.

Step 730 includes detecting, with the camera, illumination propagating at each of the plurality of directions. In an example of step 730, camera 310 detects illumination 147 propagating at each of directions 143. Step 730 may include at least one of steps 732, 734, 736, and 738.

Step 732 includes capturing a single illumination image that includes, for each direction of the plurality of directions, a respective one of a plurality of pixel-value groups generated by the illumination incident on an entrance pupil of the camera at an incident angle corresponding to the direction. The image data includes the plurality of pixel-value groups. In an example of step 732, camera 310 captures one illumination image 338, which includes, for each direction 143(i), a respective one of a plurality of pixel-value groups generated by illumination 147(i) incident on entrance pupil 311 at an incidence angle corresponding to direction 143(i). Illumination 147(i) is subsequently incident on pixel array 319. Pixel array 319 includes a plurality of pixel groups each corresponding to a respective one of the generated pixel-value groups.

In this example, image data 334 includes the plurality of pixel-value groups. A single illumination image 338 may include part or all of a scanning pattern generated by transmitter channel 240. The scanning pattern may be one of the following patterns or a combination thereof: seesaw, parallel, Lissajous, and elliptical.

Step 732 may include step 733 when the light source is configured to scan the illumination across the angular range during a temporal scan period. Step 733 includes configuring the camera to have an exposure duration that exceeds the temporal scan period. In an example of step 733, processor 320 configures camera 310 to have an exposure duration that exceeds a scanning-pattern period corresponding to illumination 147 propagating in each direction 143. The temporal scan period may correspond to a lidar frame rate, which may range from 0.1 Hz to 1.0 kHz.

Step 734 includes, for each of the plurality of directions, detecting the illumination at a respective position on a pixel array of the camera. In an example of step 734, image sensor 318 detects each of illumination 147(1, 2, . . . , N) at a respective position on, or region of, pixel array 319. Each respective region of pixel array 319 includes a respective pixel group that includes a plurality of pixels illuminated by illumination 147(i) that generate the corresponding pixel-value group.

Step 736 includes capturing, for each direction of the plurality of directions, a respective one of a plurality of illumination images that includes a respective one of a plurality pixel-value groups generated by the illumination incident on an entrance pupil of the camera at an incident angle corresponding to the direction. The image data includes the plurality of pixel-value groups. In an example of step 736, camera 310 captures, for each direction 143(i), a respective illumination image 336(i). Each illumination image 336(i) includes a respective one of a plurality of pixel-value groups generated by illumination 147(i) incident on entrance pupil 311 at an incident angle corresponding to direction 143(i). When illumination 147 is pulsed illumination with a pulse duration $\tau$ and a pulse period $T_p$ (time between pulses), processor 320 may configure camera 310 to have an exposure duration that is longer than pulse duration $\tau$ and shorter than pulse period $T_p$. Pulse period $T_p$ may correspond to a pulse repetition rate in the range of 500 kHz and 1 MHz.

Step 738 includes detecting the illumination with a lens having a field curvature less than 0.1 percent across a full field-of-view of the camera. In an example of step 738, lens 312 has a field curvature less than 0.1 percent across a full field-of-view of camera 310.

Step 740 includes storing image data corresponding to a response of the camera to the detected illumination. In example of step 740, light-source characterizer 300 stores image data 334. Image data 334 may include part or all of at least one image 336, for example, when step 730 includes step 736. Image data 334 may include part or all of image 338, for example, when step 730 includes step 732.

Step 750 includes processing the image data to characterize at least one of the angular range, pointing accuracy, pointing jitter, an intensity of the illumination, a divergence of the illumination, a uniformity of the illumination, and a fidelity of a scanning pattern, formed by the scanning light source, to a predetermined pattern. Examples of uniformity of the illumination includes uniformity of the scanning pattern's intensity distribution. Fidelity of the scanning pattern may be quantified as a deviation of the measured scanning pattern, stored as the image data, to an analytical or numerical expression of the scanning pattern stored in a memory communicatively coupled to the light source. In example of step 750, processor 320 processes image data 334 to characterize at least one of the following properties of transmitter channel 140: angular range 144, pointing accuracy, pointing jitter, an intensity of the illumination, a divergence of the illumination, a uniformity of the illumination, and a fidelity of a scanning pattern, formed by the scanning light source, to scanning pattern 339.

Figure 8:
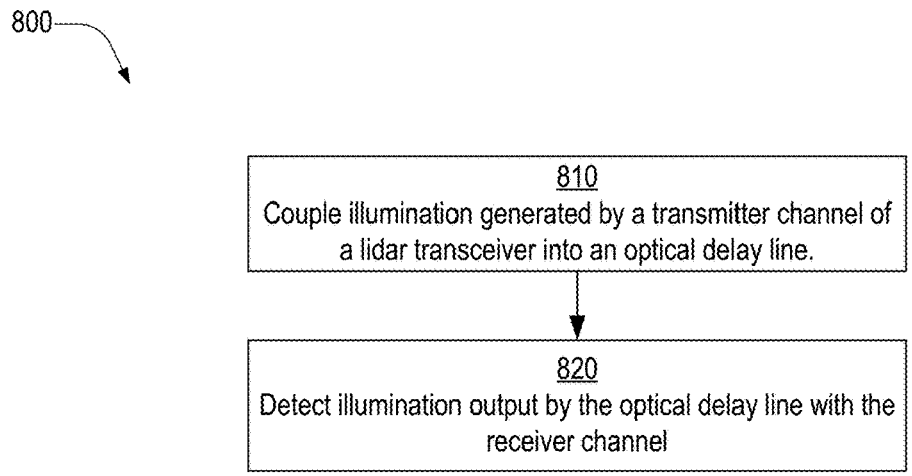
FIG. 8 is a flowchart illustrating a method for testing a receiver channel of a lidar transceiver, in an embodiment.

FIG. 8 is a flowchart illustrating a method 800 for testing a receiver channel of a lidar transceiver. Method 800 may be implemented within one or more aspects of receiver characterizer 500 and delay line 660, for example, as part of transceiver tester 600. Method 800 includes steps 810 and 820.

Step 810 includes coupling illumination generated by a transmitter channel of the lidar transceiver into an optical delay line. In an example of step 810, illumination 147 is coupled into optical delay line 665. Step 820 includes detecting the illumination output by the optical delay line with the receiver channel. In an example of step 820, receiver channel 260 detects illumination output from optical fiber 672.

Example Transmitter Testing

Testing transmitter channel 240 with light-source characterizer 300 may include characterizing global and local uniformity, field of view, jitter, distortion, pointing accuracy, and stability over time. Light from one or more near-IR and/or short-wave infrared lasers (as light source 241) may be collimated or focused onto a 1D/2D scanning mirror 244 to scan the light over the desired field of view 144 via optics 246. In receiver channel 260, light may be collected by imaging lens 266 matched to the total field of view 144 of the transmitter channel 240 and by collecting returned light onto an array of avalanche photodiodes as sensor 268.

For accurate measurements, light-source characterizer 300 may convert the angular distribution of transmitter channel 240—illumination 147—into a flat-field spatial distribution imaged onto image sensor 318. Such imaging may be accomplished with lens 312 with its entrance pupil 311 located at scanning mirror 244. A similar measurement may be performed without scanning mirror 244 when entrance pupil 311 is aligned to the pivot point, e.g., vertex 142, of the illumination beam 242 being scanned.

The optimum lens for this application depends on properties of transmitter channel 240. Lens 312 may be an f sin $\theta$, f$\theta$, or f tan $\theta$ objective. Such lens designs may be precisely calibrated for the conversion of angle to sensor position using a diffractive optic beam splitter. The beam splitter is designed to match the full field of view of the transmitter under test with an x/y grid of spots. The spacing of these spots is governed by the grating equation $m\lambda = d \sin \theta$. The advantage of this calibration method is that the grating pitch d is manufactured to better than two parts per million (ppm) allowing for very precise angular translation. Once the diffractive optical element (DOE) is fabricated, the structure of the diffraction pattern is measured against design parameters. The DOE angular spacing and diffraction efficiency may be measured with several approaches. One example of measuring the diffraction angle is to illuminate the DOE with a collimated light beam and measure the position of the centroids of the diffracted orders at a given distance away from the plane of the DOE. Diffractive characteristics may also be obtained with precise measurement of the DOE structure.

Over a broad operating temperature range, the change in angle for a fused silica DOE is approximately 55 ppm, which is still much less than the positioning requirements for the application.

An example calibration is to place the DOE at the entrance pupil of an f sin $\theta$ lens, e.g., entrance pupil 311, and illuminate the DOE with a collimated laser beam. The resulting image at the image plane is a mapping of the input beams in angle space. The positions of the diffractive orders at the image plane follow the f sin θ properties of the lens. The centroids of the diffracted spots may be analyzed to determine precise location in image space thus leading to accurate determination of the angular sensitivity of the f sin θ lens. The image of the DOE pattern may be used to analyze lens performance parameters including lens distortion and image quality. This calibration method may also apply to fθ and f tan θ lenses.

How often a system is calibrated using the DOE method depends on a number of factors including the testing environment and the lidar or similar system performance requirements. In some cases, lens 312 and image sensor 318 will only be calibrated by the manufacturer prior to shipment, while in some cases the end-user of the test system will include the calibration components in each test system for calibration at routine intervals dependent upon performance requirements.

In light-source characterizer 300, lens and camera response to input illumination may be required for calibration. System light-level or power response, flat field response, pixel to pixel variation and lens effects may also all be required to calibrate the lens and camera. Lens effects such as relative illumination and overall transmission may be required to calibrate lens 312 and camera 310.

Light level response may be determined by illuminating lens 312 and camera 310 with a collimated laser beam with a known power value, capturing the image of the laser beam, and collecting sensor count values at each pixel of the imaged spot on pixel array 319. The summation of the counts along with the integration time used in the measurement may then be used for the light level response of the system at the location at the specific image position. This is the "single spot power response." By pointing the input laser at several angles of incidence, other locations on image sensor 318 may be calibrated and a map of the entire sensor response may be made. This method may use discrete input angles, in which fitting the resulting discrete-angle data to the entire pixel array 319 yields an overall calibration map.

Another method for calibration includes illuminating lens 312 and image sensor 318 with uniform illumination, with a calibrated integrating sphere, for example. This response may be used in conjunction with a single spot power response to generate the power calibration map. Other parameters such as temperature sensitivity and wavelength sensitivity and lens projected solid angle sensitivity may also be a part of the calibration approach. The calibration map is then applied to future operation of lens 312 and sensor 318 in determining light levels.

Information related to the various calibrations is stored and used for processing and analyzing the data gathered when testing a device, such as lidar transceiver 200. This information may include test parameters, data associated with the calibration and mapping of the angle to the position in the image plane, and data associated with calibrating the test system to accurately measure irradiance for each pixel. Examples of test parameters include wavelength, detector response versus wavelength, laser power, time, date, temperature, detector response with respect to temperature, and humidity.

There are several advantages to transceiver tester 600. First, transceiver tester 600 captures the entire lidar scan field, over field of view 144, in a single image frame with no moving parts. This enables operation of transceiver tester 600 at the scan frequency of the lidar transmitter. System 600's use of a camera 310 for measuring power of illumination 147 is significantly faster than measuring power with a single power meter mounted on a scanning goniometer stage, and allows for high throughput and making it compatible for testing in high-volume production of lidar transceivers 200. Camera 310 may also capture high-resolution video at video frame rates, which enables real-time measurement of jitter and changes in uniformity. Transceiver tester 600 is also compact compared to current testing methods that require propagating the lidar beam several meters.

Example Receiver Testing

Receiver channel 260 of lidar transceiver 200 includes receiver optics, sensors, and electronics. The receiver optics is for example a focusing lens, a 2D imaging objective lens, or a cylindrical objective lens. Sensor 268 may be a single element photodiode (PD), a single element avalanche PD or single-photon avalanche diode (SPAD), a 1D or 2D array of such detectors, or a CMOS type camera sensor.

To effectively test 3D-image acquisition, illumination incident on sensor 268 may be controlled while taking into account optical components, such as imaging systems 543 and 544, between source illumination distribution and a sensor plane of sensor 268. In many cases, receiver characterizer 500 may include at least one of imaging systems 543 and 544 for focusing input illumination from light source 542 onto receiver channel 260. For systems with no imaging lenses, the illumination is more straightforward as the test source simply illuminates the sensor with no intervening optical components.

Advantages of receiver characterizer 500 over current measurement methods include a compact footprint, ability to include multiple sources, automated adjustment to adapt the source to the test requirements, its functionality to perform a single test to measure multiple parameters.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A method for characterizing a scanning light source configured to emit illumination propagating in any one of a plurality of directions spanning an angular range, the method comprising:
   aligning an entrance pupil of a camera such that a vertex of the angular range, at which each of the plurality of directions intersect, is in a plane of the entrance pupil;
   aligning an optical axis of the camera such that the optical axis intersects a vertex of the angular range at which each of the plurality of directions intersect
   detecting, with the camera, illumination propagating at each of the plurality of directions;
   storing image data corresponding to a response of the camera to the detected illumination; and
   processing the image data to characterize at least one of the angular range, pointing accuracy, pointing jitter, a divergence of the illumination, and a fidelity of a scanning pattern, formed by the scanning light source, to a predetermined pattern.

2. The method of claim 1, the step of detecting comprising capturing, for each direction of the plurality of directions, a respective one of a plurality of illumination images that includes a respective one of a plurality of pixel-value groups generated by the illumination incident on the entrance pupil of the camera at an incident angle corresponding to the direction, the image data including the plurality of pixel-value groups.

3. The method of claim 1, the step of detecting including, for each of the plurality of directions, detecting the illumination at a respective position on a pixel array of the camera.

4. The method of claim 1,
the step of processing the image data including characterizing the fidelity of the scanning pattern, formed by the scanning light source, to the predetermined pattern.

5. The method of claim 1, the step of processing the image data including processing the image data to characterize pointing accuracy.

6. The method of claim 1, the step of processing the image data including processing the image data to characterize the angular range.

7. The method of claim 1, the step of processing the image data including processing the image data to characterize pointing jitter.

8. The method of claim 1, the step of processing the image data including processing the image data to characterize the divergence of the illumination.

9. A method for characterizing a scanning light source, comprising:
scanning illumination, emitted by the scanning light source, across an angular range such that the illumination propagates at each of a plurality of directions;
aligning an entrance pupil of a camera such that a vertex of the angular range, at which each of the plurality of directions intersect, is in a plane of the entrance pupil;
aligning an optical axis of the camera such that the optical axis intersects a vertex of the angular range at which each of the plurality of directions intersect
detecting, with the camera, the illumination by capturing a single illumination image that includes, for each direction of the plurality of directions, a respective one of a plurality of pixel-value groups generated by the illumination incident on the entrance pupil at an incident angle corresponding to the direction; and
processing the single illumination image to characterize at least one of the angular range, pointing accuracy, pointing jitter, a divergence of the illumination and a fidelity of a scanning pattern, formed by the scanning light source, to a predetermined pattern.

10. The method of claim 9, scanning comprising: scanning the illumination across the angular range during a temporal scan period, and further comprising:
configuring the camera to have an exposure duration that exceeds the temporal scan period.

11. A light-source tester for characterizing a scanning light source that emits illumination propagating in any one of a plurality of directions spanning an angular range, the light-source tester comprising:
a camera having a system field of view equal to or exceeding the angular range;
a processor coupled to the camera; and
a memory storing machine-readable instructions that, when executed by the processor, control the processor to, when (i) an entrance pupil of the camera is aligned such that a vertex of the angular range, at which each of the plurality of directions intersect, is in a plane of the entrance pupil, and (ii) an optical axis of the camera intersects a vertex of the angular range at which each of the plurality of directions intersect;
detect, with the camera, illumination propagating at each of the plurality of directions;
store image data corresponding to a response of the camera to the illumination imaged thereon; and
process the image data to characterize at least one of the angular range, pointing accuracy, pointing jitter, a divergence of the illumination, and a fidelity of a scanning pattern, formed by the scanning light source, to a predetermined pattern.

12. The light-source tester of claim 11, the camera including a single camera having a camera field of view equal to or exceeding the angular range.

13. The light-source tester of claim 11, the camera including an actuator configured to translate the camera along a circular arc around a vertex of the angular range and in a plane perpendicular to the optical axis.

14. The light-source tester of claim 11, the camera including an imaging lens having field curvature less than 0.1 percent across a full field-of-view of the camera.

15. The light-source tester of claim 11, the memory also storing machine-readable instructions that, when executed by the processor, control the processor to, when detecting illumination:
capture a single illumination image that includes, for each direction of the plurality of directions, a respective one of a plurality of pixel-value groups generated by the illumination incident on the entrance pupil at an incident angle corresponding to the direction, the image data including the plurality of pixel-value groups.

16. The light-source tester of claim 11, the memory also storing machine-readable instructions that, when executed by the processor, control the processor to, when detecting illumination:
capture, for each direction of the plurality of directions, a respective one of a plurality of illumination images that includes a respective one of a plurality of pixel-value groups generated by the illumination incident on the entrance pupil at an incident angle corresponding to the direction, the image data including the plurality of pixel-value groups.

17. The light-source tester of claim 11, the memory also storing machine-readable instructions that, when executed by the processor, control the processor to, when detecting illumination and for each of the plurality of directions:
detect the illumination at a respective position on a pixel array of the camera.

18. The light-source tester of claim 11, the memory also storing machine-readable instructions that, when executed by the processor, control the processor to, when processing the image data, characterize the angular range.

* * * * *